United States Patent [19]

Austin et al.

[11] Patent Number: 5,898,819

[45] Date of Patent: Apr. 27, 1999

[54] SYSTEM FOR BLACK AND WHITE PRINTING OF COLORED PAGES

[75] Inventors: Dennis Robert Austin, Los Altos; Anders Kierulf, San Carlos, both of Calif.

[73] Assignee: Microsoft Corporation, Redmond, Wash.

[21] Appl. No.: 08/658,699

[22] Filed: Jun. 5, 1996

[51] Int. Cl.[6] .............................. H04N 1/40; H04N 1/387; G06K 15/00; G09G 5/10

[52] U.S. Cl. ........................ 395/109; 395/114; 358/448; 358/452; 358/453; 345/147; 345/150

[58] Field of Search ..................................... 358/401, 448, 358/452, 453, 455, 459, 530; 395/109, 114; 345/141, 143, 144, 147, 150, 153, 154, 431, 432, 199; 348/576, 577, 649, 650, 651, 35; 707/528, 530

[56] References Cited

U.S. PATENT DOCUMENTS

| | | | |
|---|---|---|---|
| 4,688,031 | 8/1987 | Haggerty | 345/149 |
| 4,703,318 | 10/1987 | Haggerty | 345/147 |
| 4,788,535 | 11/1988 | Chikara et al. | 345/153 |
| 5,111,533 | 5/1992 | Sekine et al. | 395/109 |
| 5,119,086 | 6/1992 | Nishioka et al. | 345/147 |
| 5,442,375 | 8/1995 | Wojaczynski et al. | 345/147 |
| 5,485,288 | 1/1996 | Kamei et al. | 358/530 |
| 5,546,105 | 8/1996 | Leak | 345/155 |

OTHER PUBLICATIONS

Microsoft PowerPoint Handbook, Microsoft Corporation, Cover page, Copyright Information page, pp. 467, 472–475, Copyright 1992.

Using PowerPoint for Windows 95, Second Edition, 1995.

Aldus PhotoStyler User Manual Version 1.1 Special Edition for use with Microsoft Windows, Mar. 1992.

*Primary Examiner*—Edward L. Coles
*Assistant Examiner*—Mark Wallerson
*Attorney, Agent, or Firm*—Jones & Askew, LLP

[57] ABSTRACT

A system for converting a colored page to a black and white page for black and white printing. A colored page is selected for conversion to black and white. The colored page contains at least one graphical item, such as text, a frame, a line, a closed shape, or a picture. One of the graphical items is then selected for conversion to black and white. After a graphical item is selected, a mode is selected for converting the selected graphical item to black and white. The modes can include a gray scale mode, a light gray scale mode, an inverse gray scale mode, a black with white fill mode, a gray with white fill mode, a black with gray fill mode, a black mode, a white mode, a don't show mode, and an automatic mode. These modes each describe a different method for converting colors in the selected graphical item to black, white, and shades of gray. The selected graphical item is then converted to black and white based on the selected mode. These tasks can be repeated for each graphical item on the colored page. The colored page is printed in black and white in response to converting each graphical item on the colored page.

54 Claims, 11 Drawing Sheets

SYSTEM FOR BLACK AND WHITE PRINTING OF COLORED PAGES

FIELD OF THE INVENTION

The present invention relates to a printing system for a computer system, and is more particularly directed to a system for black and white printing of a colored page by converting each color graphical item on the page to a selected black and white mode.

BACKGROUND OF THE INVENTION

Making presentations and conducting meetings are important aspects of many occupations. Executives make presentations to directors, managers conduct meetings with staff, salespersons make presentations to potential customers, doctors conduct meetings with nurses, lawyers make presentations to juries, and so on. A great many professionals conduct and attend meetings and presentations regularly. Much effort therefore goes into creating and delivering effective presentations and preparing for and conducting effective meetings.

With specialized software, conventional personal computers provide effective platforms for creating and conducting presentations and meetings. Currently available presentation program modules can turn a personal computer into a customized presentation system for creating, delivering, and printing slide presentations. Generally described, these presentation systems provide a specially designed, user-friendly, palette of tools to assist in the creation of presentation slides to be subsequently displayed to an audience. These presentation systems also allow the slides to be sequentially presented to an audience, point-by-point and slide-by-slide, with color, animation, audio, and transition effects that enrich and enliven the presentation.

After designing the color presentations, the user may also want to print the color presentations so that the audience may have personal copies for note-taking during delivery of the presentation and for future reference. Because providing color versions of the presentation is usually expensive, oftentimes, the user provides black and white versions of the color presentations. The conversion process and printing process are supported by the presentation program modules.

In some presentation program modules, a standard process is typically used for converting the color presentations to black and white. This process converts any color picture to a gray scale rendition, which is a conversion of color images to varying shades of gray. For color presentations, however, a simple gray scale conversion is generally inadequate because presentation images frequently have a dark, and sometimes complex, decorative background. Fades, filled objects, and backgrounds, which look great on an on-screen color presentation, are often unreadable in the form of a printed handout. As a result, other computer printing systems supported by presentation program modules have been designed to provide improved conversion methods for color presentations.

One method implemented to provide an improved translation from a color presentation to a black and white presentation is preparing special black and white templates, which are used as substitutes for the colors from a color template. One problem with this black and white conversion is that it creates a new black and white presentation that can greatly vary from the color presentation. Another problem is that when the user makes custom changes to the black and white presentation, there is no way to preserve the color and black and white versions in synchronization. Also, there is no automatic method for deriving a customized black and white version so that it can be re-derived whenever necessary as edits are made in the color version.

Another method used provides a black and white checkbox in the print dialog box of a screen display for supporting print operations. In response to selection of the checkbox, the program supports an automatic conversion of a color presentation to black and white. This conversion employs a gray scale conversion for the color presentation. The text is printed in black and white, and the program determines the best black and white conversion based on the type of art to be converted. The problem with this method is that the user has no control over the black and white conversion operations. Also, the user cannot see the conversion to black and white before printing the presentation on a printer.

One additional method for converting color presentations to black and white omits any complex backgrounds and replaces the complex backgrounds with a white background. Color images are converted to black and white images. One drawback with implementing this method is that when text is printed in any color other than black and fills are colored, the text and fills do not print well in black and white.

A user needs flexibility in converting complex color presentations, as well as the ability to see the conversions as they are implemented on-screen. It is usually preferable to change a complex background to white and reduce it's complexity. Foreground figures and text typically print better in solid black. Other figures, like pictures and company logo types, are better rendered with a standard conversion to gray scale.

Therefore, there is a need for a system that allows more control over converting a color presentation to black and white. There is also a need for a system that allows images, objects and text on a page to be converted item-by-item. Furthermore, there is a need for a system that allows the black and white version of the color presentation to be viewed as each item is converted to black and white before printing the presentation. Finally, there is a need for a system that provides a variety of modes for black and white conversion of a color presentation.

SUMMARY OF THE INVENTION

The present invention satisfies the above-described needs by providing an improved system for converting a colored page to a black and white page for black and white printing The first step is to select the colored page for conversion to black and white. The colored page contains at least one graphical item, such as text, a frame, a line, a closed shape, or a picture. The next step is to select one of the graphical items for conversion to black and white. After a graphical item is selected, a print mode is selected for converting the selected graphical item to black and white. The print modes include a gray scale mode, a light gray scale mode, an inverse gray scale mode, a black with white fill mode, a gray with white fill mode, a black with gray fill mode, a black mode, a white mode, a don't show mode, and an automatic mode. These modes each describe a different method for converting colors in the selected graphical item to black, white, and shades of gray. The next step is to convert the selected graphical item to black and white based on the selected mode. The tasks are repeated for each graphical item on the colored page. The colored page is printed in black and white in response to converting each graphical item on the colored page.

In view of the foregoing, the present invention provides an improved system for black and white printing of a colored page. The system allows more control over converting a color presentation to black and white by converting images, objects and text on a page to black and white on an item-by-item basis. The system allows the black and white version of the color presentation to be viewed on a display device as each item is converted to black and white before printing the presentation.

These and other objects, features, and advantages of the present invention may be more clearly understood and appreciated from a review of the following detailed description of the disclosed embodiments and by reference to the appended drawings and claims.

DETAILED DESCRIPTION OF THE PREFERRED EMBODIMENT

Figure 1:
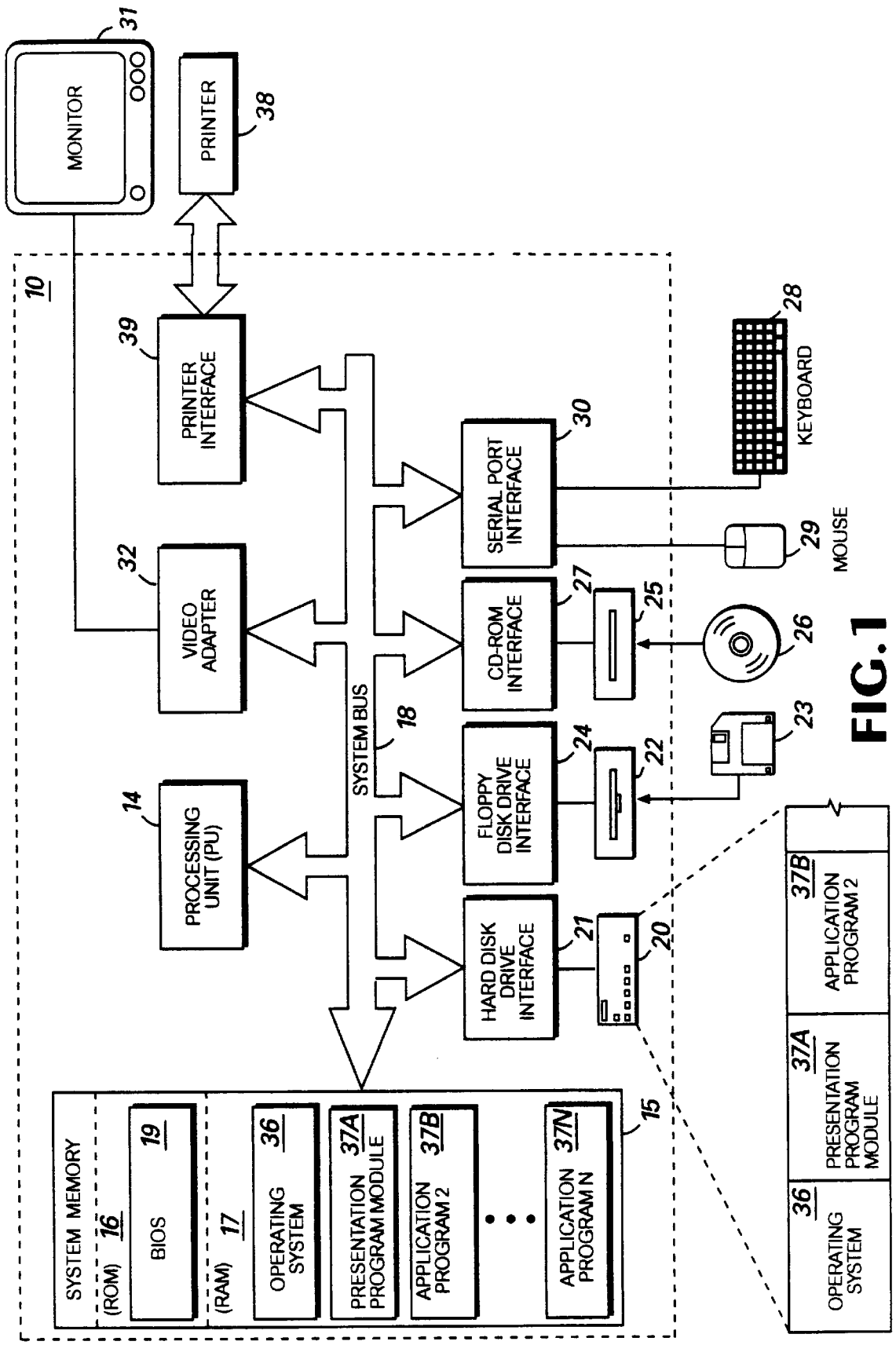
FIG. 1 is a block diagram of a personal computer that provides the operating environment for the preferred embodiment of the present invention.

The present invention is directed to a system for black and white printing of colored pages, which are primarily designed for viewing on a computer display or a color slide. The preferred environment of the present invention is represented by "MICROSOFT POWERPOINT FOR WINDOWS 95" application program, which is marketed by Microsoft Corporation of Redmond, Wash. Briefly described, the preferred program allows a user to design on-screen color presentations and convert these presentations to black and white by selecting from a variety of modes for black and white conversion. The present invention provides a computer-implemented process for converting color images, objects and text on a page, item-by-item, to black and white and is used within the framework of the "MICROSOFT POWERPOINT FOR WINDOWS 95" application program to support printing of presentations. Moreover, the user can design or select a colored page, supported by a program module, and alter the colored images, objects, and text on the page, item-by-item, to obtain an on-screen black and white view of each graphical item before printing the page. Thus, the preferred program provides a system for black and white printing of a colored page after conversion of selected graphical items on the page to one of a plurality of black and white modes selected by a user.

Although the preferred embodiment will be generally described in the context of a program and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including a processing unit (PU), memory storage devices, display devices, and input devices. Furthermore, these processes and operations may utilize conventional computer components in a heterogeneous distributed computing environment, including remote file servers, compute servers, and memory storage devices. Each of these distributed computing components is accessible by the PU via a communication network.

The processes and operations performed by the computer include the manipulation of signals by a PU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, values, elements, symbols, characters, terms, numbers, points, records, objects, images, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as selecting, converting, adding, comparing, calculating, moving, positioning, placing, altering, printing, etc. which are often associated with manual operations performed by a human operator. The operations described herein are machine operations performed in conjunction with various input provided by a human operator or user that interacts with the computer.

In addition, it should be understood that the programs, processes, methods, etc. described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and the preferred operating environment will be described.

FIG. 1 illustrates various aspects of the preferred computing environment in which the present invention is designed to operate. Those skilled in the art will immediately appreciate that FIG. 1 and the associated discussion are intended to provide a brief, general description of the preferred computer hardware and program modules, and that additional information is readily available in the appropriate programming manuals, user's guides, and similar publications.

As shown in FIG. 1, a personal computer 10 includes a processing unit (PU) 14, such as the 80486 or "PENTIUM" microprocessors manufactured by Intel Corporation of Santa Clara, Calif. It will be understood that the computer 10 can include other PU models, such as a member of the MIPS family by Silicon Graphics, Inc. or a Power PC processor by Motorola Corporation. The personal computer also includes system memory 15 (including read only memory (ROM) 16 and random access memory (RAM) 17), which is connected to the PU 14 by a system bus 18. The BIOS 19 for the personal computer 10 is stored in ROM 16. Those skilled in the art will recognize that the BIOS 19 is a set of basic routines that helps to transfer information between elements within the preferred personal computer 10. Although the preferred computer 10 includes a ROM-based BIOS, those skilled in the art will appreciate that the computer 10 can be implemented by other computer models, such as the Apple "Macintosh" series or a SUN workstation.

Within the personal computer 10, a local hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM drive 25, which is used to read a CD-ROM disk 26, is connected to the system bus 18 via a CD-ROM interface 27. A user enters commands and information into the personal computer 10 by using a keyboard 28 and/or pointing device, such as a mouse 29, which are connected to the system bus 18 via a serial port interface 30. Other types of pointing devices (not shown in FIG. 1) include track pads, track balls, head-trackers, data gloves, pens, and other devices suitable for positioning a cursor on a computer monitor 31. The monitor 31 or other kind of display device is connected to the system bus 18 via a video adapter 32. A printer 38 is connected to the system bus 18 via a printer interface 39.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules such as an operating system 36, application programs 37, and data are provided to the personal computer 10 via one of the local or remote memory storage devices, which may include the local hard disk drive 20, floppy disk 23, CD-ROM 26, RAM 17, ROM 16, and the remote memory storage device 33. In the preferred personal computer 10, the local hard disk drive 20 is typically used to store data and programs, including the operating system and programs.

When the personal computer 10 is turned on or reset, the Basic Input/Output System (BIOS) 19, which is stored in the ROM 16, instructs the PU 14 to load the operating system 36 from the hard disk drive 20 into the RAM 17. Once the operating system 36 is loaded into RAM 17, the PU 14 executes the operating system 36 and causes the visual elements associated with the user interface of the operating system 36 to be displayed on the monitor 31.

The operating system 36, in conjunction with the BIOS 19 and associated device drivers, provides the basic interface between the computer's resources, the user, and the application program. For the present invention, the preferred application program is a presentation program module 37a. The operating system 36 interprets and carries out instructions issued by the user. For example, when the user wants to load the presentation program module 37a, the operating system 36 interprets the instruction (e.g., double clicking on the application program's icon) and causes the PU 14 to load the program code into RAM 17 from either the local hard disk drive 20, floppy disk 23, CD-ROM 26, or the remote memory storage device 33. Once the presentation program module 37a is loaded into the RAM 17, it is executed by the PU 14. In case of large programs, the PU 14 loads various portions of program modules into RAM 17 as needed.

The operating system 36 provides a variety of functions or services that allow an application program 37b to easily deal with various types of input/output (I/O). This allows the application program 37b to issue relatively simple function calls that cause the operating system 36 to perform the steps required to accomplish various tasks, such as displaying text on the monitor 31 or printing text on the attached printer 38. Generally described, the application program 37b communicates with the operating system 36 by calling predefined functions provided by the operating system 36. The operating system 36 responds by providing the requested information in a message or by executing the requested task.

With continuing reference to FIG. 1 and now turning to FIGS. 2a–7, the user's environment for the preferred embodiment of the present invention will be described by utilizing screen displays generated by the preferred application program.

FIGS. 2a–7 illustrate the screen displays provided by the preferred presentation program module 37a to allow the user to design a color presentation, to convert the color presentation to an on-screen black and white presentation, and to print either a colored version or a black and white version of the presentation as viewed on the display screen. For purposes of this discussion, the term "presentation" is used to describe a standard slide or page containing objects, images, text, and the like viewed within a presentation display area 52. The presentations are based on design templates, which contain standard backgrounds, installed with the presentation program module 37a.

Figure 2A:
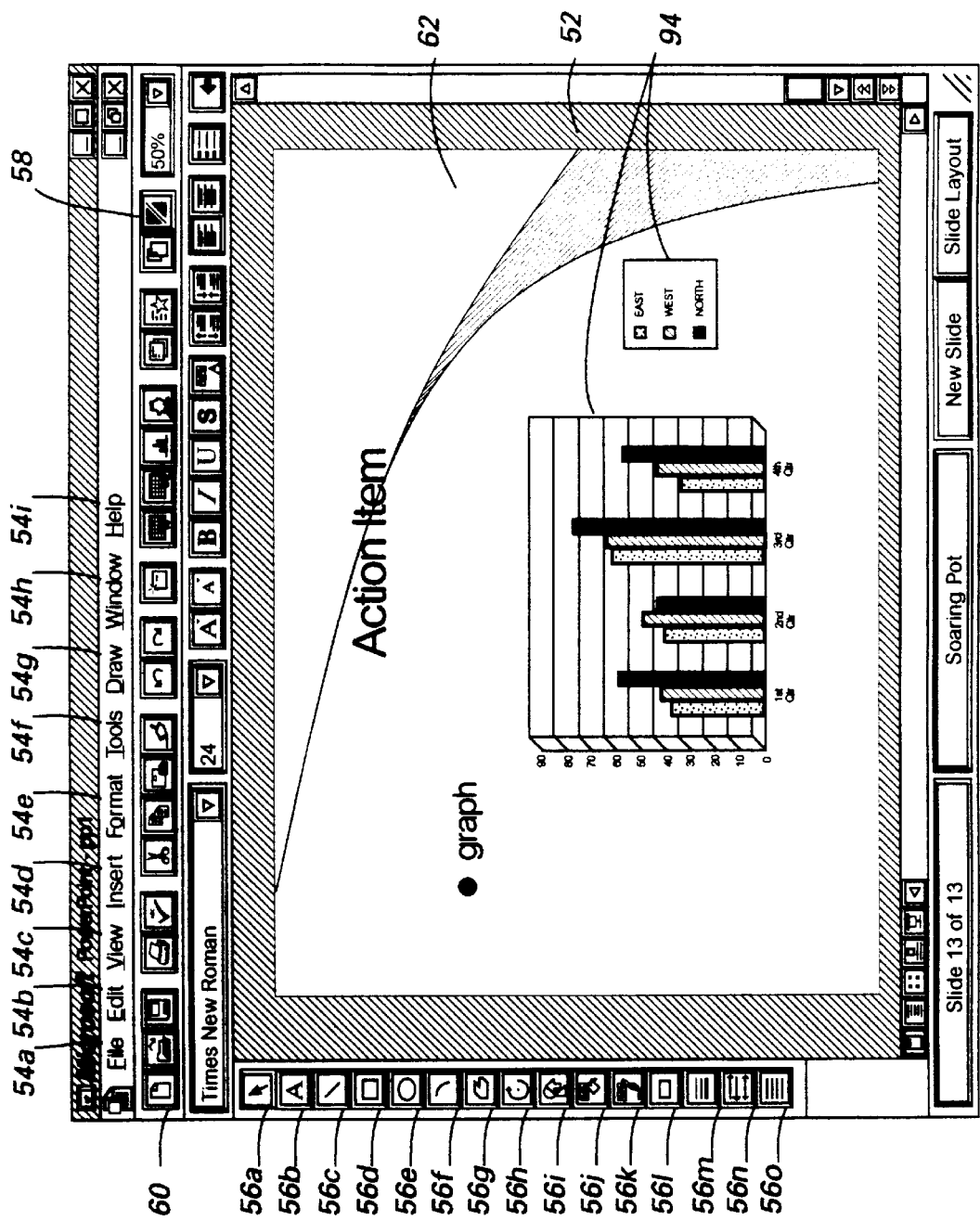
FIG. 2a is a screen display illustrating an initial presentation display screen in accordance with the preferred embodiment of the present invention.

FIG. 2a depicts an initial presentation display screen 50 that is displayed on the monitor 31. The presentation display screen 50 includes the presentation display area 52, a series of general operational choice menus 54a–i, drawing design buttons 56a–o and a standard tool bar 60. The presentation display screen 50 is displayed by the presentation program module 37a after the user selects the presentation program module 37a, which is stored in the system memory 15 of the computer 10.

Because the present invention focuses on one aspect of the presentation program module 37a, the black and white presentation feature, primary focus will be placed on the general operational menus, namely the "File" menu 54a and the "View" menu 54c, and a black and white view button 58 located at the right end of the standard tool bar 60, which are the main functions used in the preferred embodiment of the present invention.

The slide presentation screen provides a "File" menu 54a that may be used to open existing presentations stored in one of the computer's memory storage devices, open new presentations so that the user may design a new presentation by using the drawing design buttons 56a-o, save a slide design, or print the slide or slides selected by the user in color and/or black and white. A "View" menu 54c allows the user to view the presentation in different formats, including outline form, slide form, and black and white form. Of particular interest is the use of the black and white feature under the "View" menu and the black and white view button 58 located at the right end of the standard tool bar 60 for reasons to be described below.

Figure 2B:
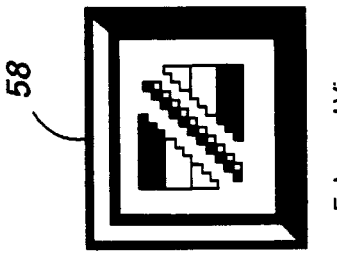
FIG. 2b is a drawing of an enlarged view of a preview button in accordance with the preferred embodiment of the present invention.

In FIG. 2a, a color presentation (not shown) is selected by one of the methods described above, either designing a new presentation or opening an existing presentation. After the color presentation is designed or selected, the presentation can be converted to a standard black and white version of the presentation 62. This standard conversion is performed by clicking the black and white preview button 58 using the mouse 29. An enlarged version of the preview button 58 is shown in FIG. 2b. When the black and white preview button 58 is selected, the color presentation is automatically changed to the black and white version of the presentation 62 as depicted on the presentation display area 52 of the presentation display screen 50. The presentation program module 37a of the present invention automatically selects a mode for conversion to black and white for the entire presentation 62. There are various modes for conversion to black and white that will be discussed in greater detail below. The mode selected by the program module is an Automatic mode, which converts the presentation 62 to default black and white settings based upon graphical items present in the presentation 62. Graphical items include pictures, graphs, text, backgrounds, closed shapes, figures, frames, lines, and so forth.

Figure 3:
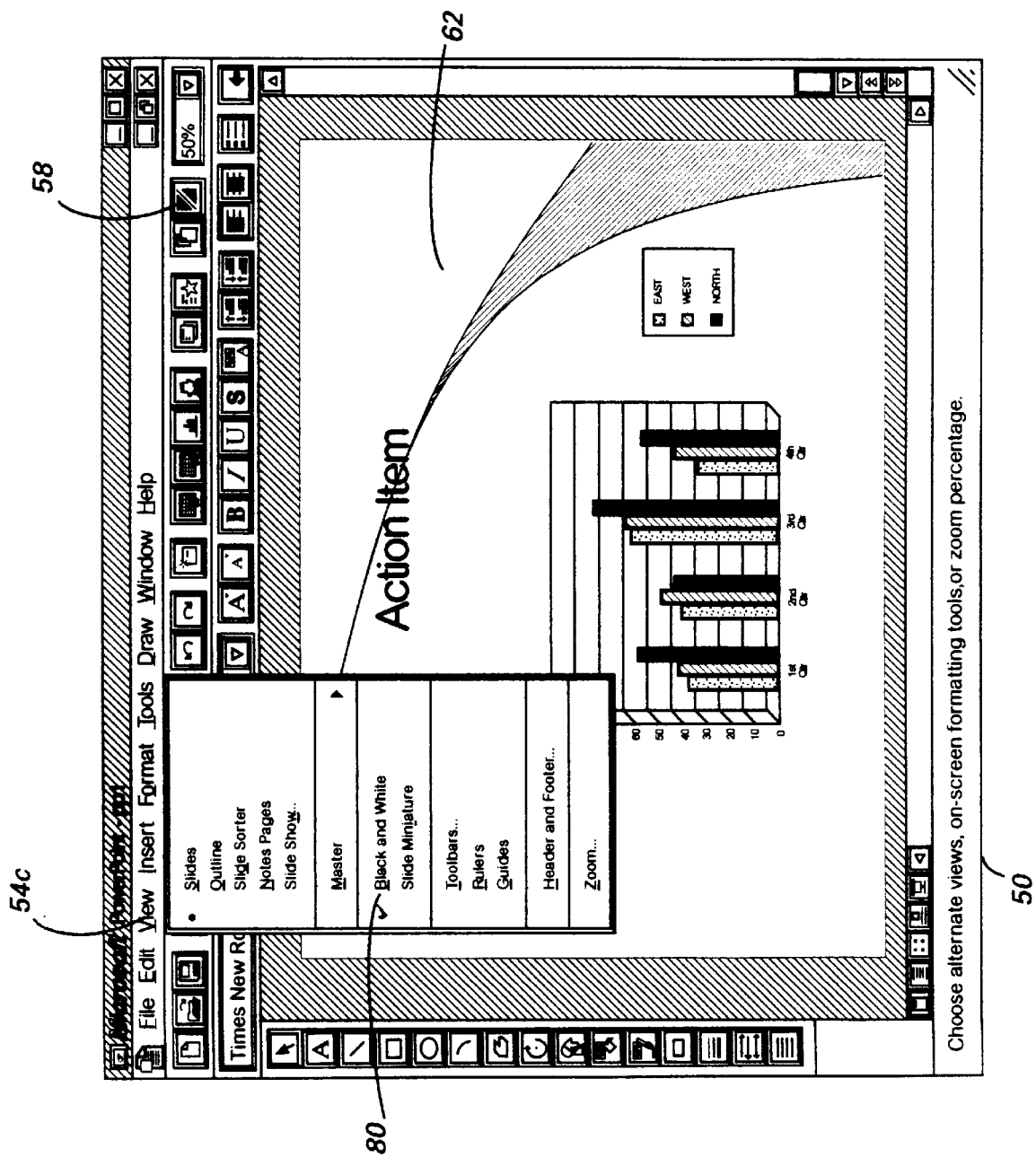
FIG. 3 is a screen display illustrating of use of a "View" menu in accordance with the preferred embodiment of the present invention.

Another avenue by which the user can convert the color presentation to black and white is illustrated in FIG. 3. FIG. 3 depicts a screen display with the "View" menu selected. The user selects the "View" menu 54c by clicking onto the word "View" using the mouse 29. The user then moves down to a black and white option 80 located in the "View" menu 54c using the mouse 29. By selecting the black and white option 80, the color presentation is converted to its black and white presentation 62. As previously described, the presentation program module 37a of the present invention automatically selects a mode for conversion to black and white. The Automatic mode converts the entire presentation 62 to default black and white settings based upon the type of graphical items present in the presentation 62. These default settings convert objects and text in the presentation 62 according to the following guidelines listed in Table 1.

TABLE 1

Automatic mode

| graphical item | default B&W setting |
|---|---|
| Text | Black |
| Text shadows | Omitted |
| Fills | Gray scale |
| Frame | Black |
| Object shadows | Gray |
| Lines | Black |
| Backgrounds | White |

After selecting the black and white preview button 58 (FIGS. 2a and 3) or selecting the black and white option 80 under the "View" menu (FIG. 3) to obtain the default black and white settings listed in Table 1, the user may want to customize the black and white presentation 62 to obtain a better contrast for specific graphical items or view the presentation 62 from various black and white perspectives before printing the presentation 62 on the printer 38. In order to customize the presentation 62, the user must select the specific graphical item that the user wants to change. This customization process will be described in greater detail with respect to FIGS. 4 and 5.

Figure 4:
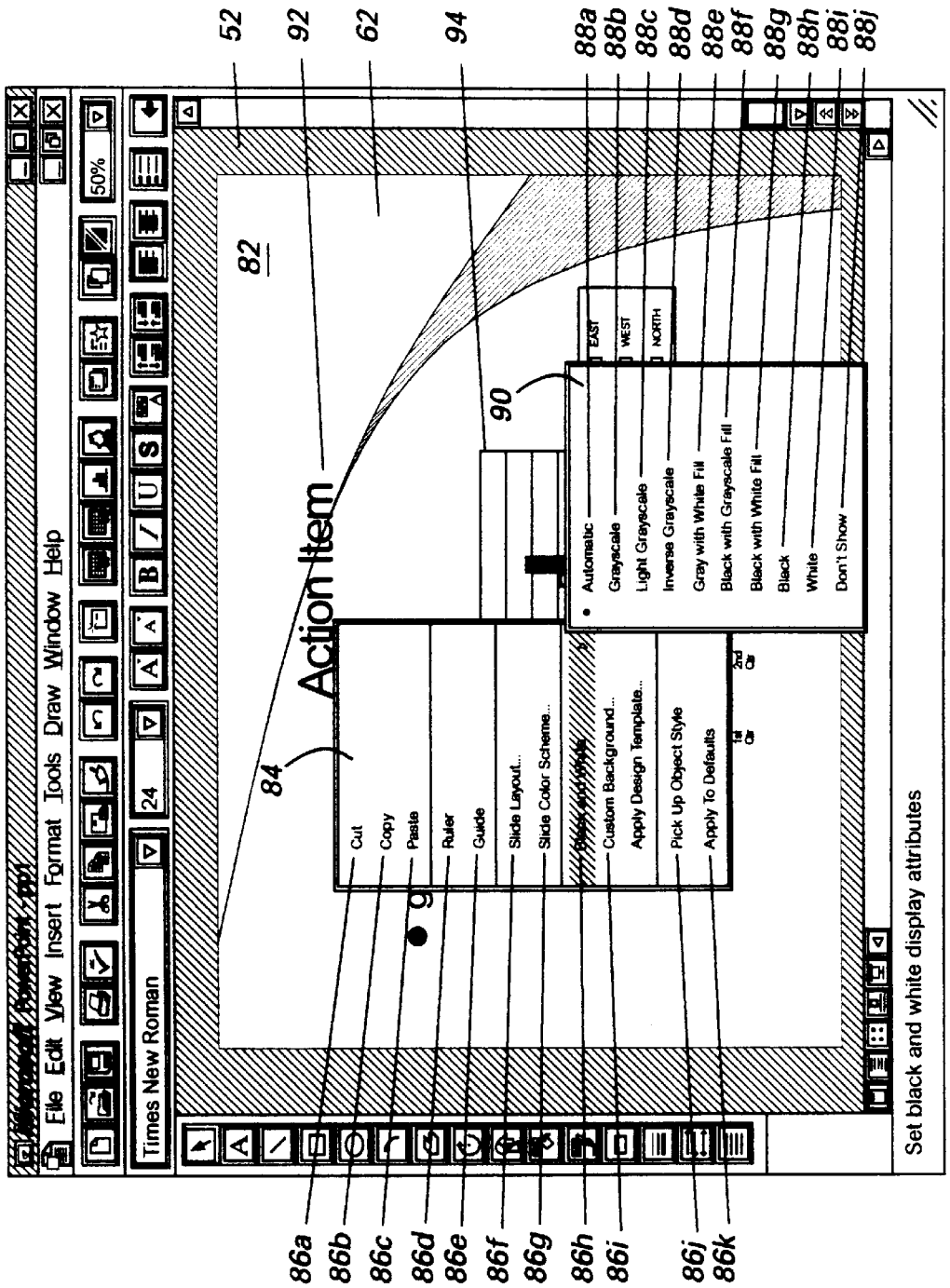
FIG. 4 is a screen display illustrating a selection of a graphical item and a contextual menu associated with the graphical item in accordance with the preferred embodiment of the present invention.

Now turning first to FIG. 4, a screen display depicts a selection of a graphical item and a contextual menu associated with the graphical item. The user selects the desired graphical item by moving the mouse 29 to the location of the graphical item and clicks the mouse 29. Once the user clicks the mouse 29 on the graphical item, the graphical item is highlighted (not shown). In this screen display example, the background 82 of the presentation 62 is selected as the graphical item to be converted to another mode of black and white. After selecting the background 82, the user clicks the mouse 29 a second time to obtain the contextual menu 84, which appears in the presentation display area 52 near the selected graphical item. The contextual menu 84 contains a list of commands 86a–k that may be performed with respect to the selected graphical item. These commands include cut 86a, copy 86b, paste 86c, and particularly, black and white 86h.

The user moves the mouse 29 until the pointer highlights the black and white command 86h within the contextual menu 84. Once the black and white command 86h is highlighted, a sub-menu 90 appears on the presentation display area 52 of the presentation display screen 50. This sub-menu 90 contains a plurality of modes 88a–j for conversion to black and white. These modes for converting the selected graphical item to black and white include the Automatic mode 88a, which was discussed earlier, a Gray Scale mode 88b, a Light Gray Scale mode 88c, an Inverse Gray Scale mode 88d, a Gray With White Fill mode 88e, a Black With Gray Fill mode 88f, a Black With White Fill mode 88g, a Black mode 88h, a White mode 88i, and a Don'Show mode 88j. These modes each describe a different method for converting colors in the selected graphical item to black, white, and shades of gray. Those skilled in the art will appreciate that the present invention is not limited to this set of modes for converting a color presentation to black and white. The various modes will be discussed in greater detail below along with representative flow diagrams for the Black With White Fill mode, the Gray With White Fill mode, and the Black With Gray Fill mode, FIGS. 9–11, respectively.

When the sub-menu 90 appears on the presentation display screen 50, the user selects one of the various modes for conversion to black and white by moving the pointer to the desired mode using the mouse 29. Once the mode is selected, the selected graphical image immediately changes to the mode of black and white selected. As a result, the user sees an on-screen representation of the presentation 62 in black and white as it is altered, item-by-item.

Figure 5:
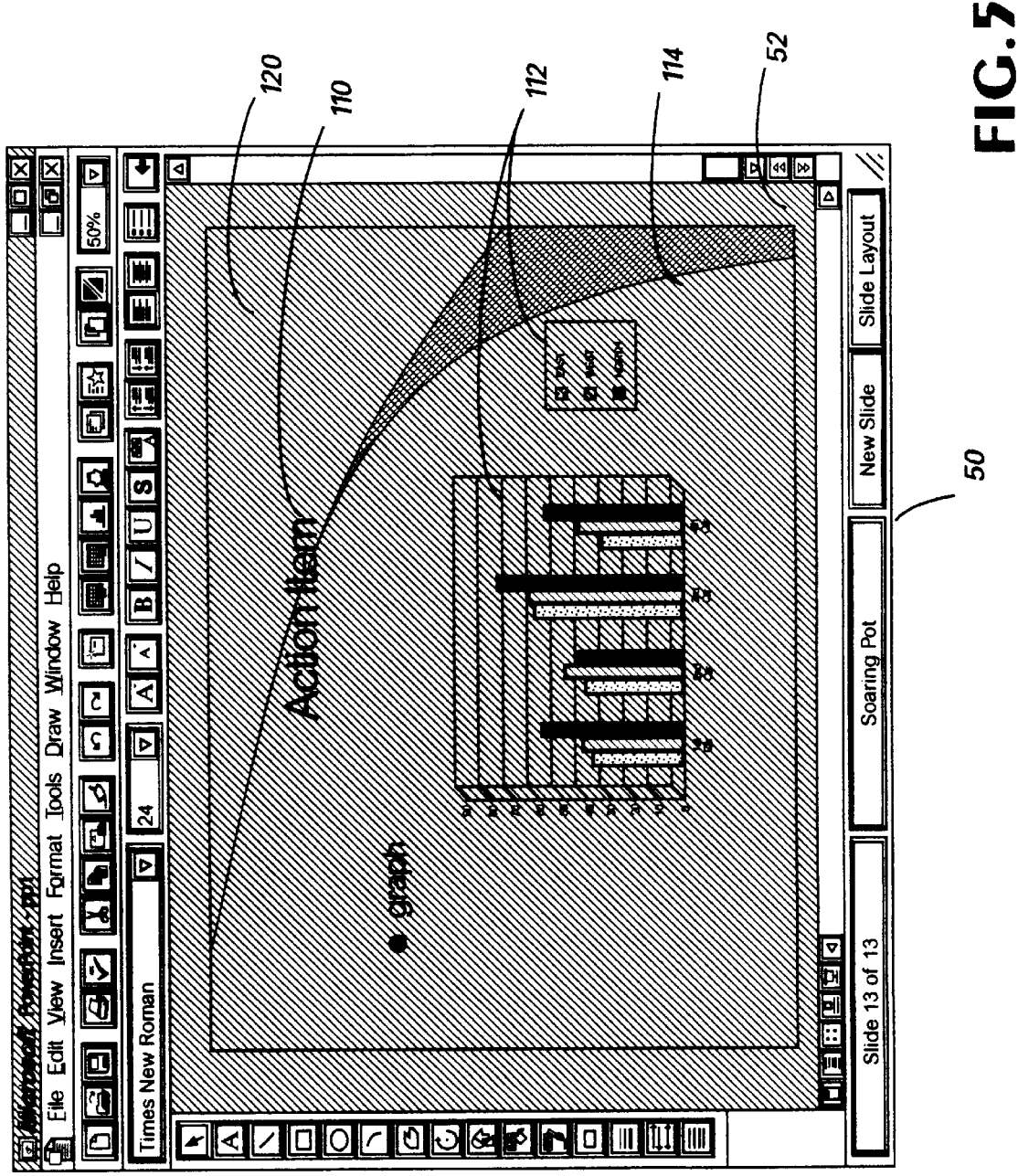
FIG. 5 is a screen display illustrating a customized version of the presentation of FIG. 4 in accordance with the preferred embodiment of the present invention.

Now turning to FIG. 5, a screen display depicts a customized version of the presentation of FIG. 4. A presentation 114 as depicted on the presentation display area 52 of the presentation display screen 50 is an example of one way the presentation 62 of FIG. 4 can be altered on-screen and printed by converting specific graphical items. In this case, the user alters the black and white version of the background 82 (FIG. 4) to a background 120, a picture 94 in the form of a graph with code (FIG. 4) to a picture 112, and text 92 forming the phrase "Action Item" (FIG. 4) to text 110. One of ordinary skill in the art will understand that these selected graphical items are not the only graphical items available for conversion to black and white.

To convert the presentation 62 of FIG. 4 to the presentation 114 of FIG. 5, the user can select the background 82, as previously described. The user then clicks the mouse 29 a second time to obtain the contextual menu 84 and selects the black and white command 86h to obtain the sub-menu 90. Once the sub-menu 90 appears, the user can select the Light Gray Scale mode 88c. Once this mode is selected, the background 82 can be converted to the background 120, as shown in FIG. 5.

Next, the user selects the text "Action Item" 92 in FIG. 4. The user then clicks the mouse 29 a second time to obtain the contextual menu 84 and selects the black and white command 86h to obtain sub-menu 90. Once the sub-menu 90 appears, the user selects the Light Gray Scale mode 88c. Once this mode is selected, the text 92 in black can be converted to the text 110, as shown in FIG. 5.

Finally, the user selects the picture 94 in FIG. 4. (See FIG. 2a for a clear view of the picture 94.) The user then clicks the mouse 29 a second time to obtain the contextual menu 84 and selects the black and white command 86h to obtain sub-menu 90. Once the sub-menu 90 appears, the user selects the Black With White Fill mode 88g. Once this mode is selected, the picture 94 can be converted to the picture 112, as shown in FIG. 5. The results of these changes can be clearly seen upon comparison of FIG. 2a and FIG. 5. One of ordinary skill in the art will appreciate that the graphical items selected and the modes selected for converting these graphical items are not the only combinations available for converting the presentation to black and white.

Figure 6:
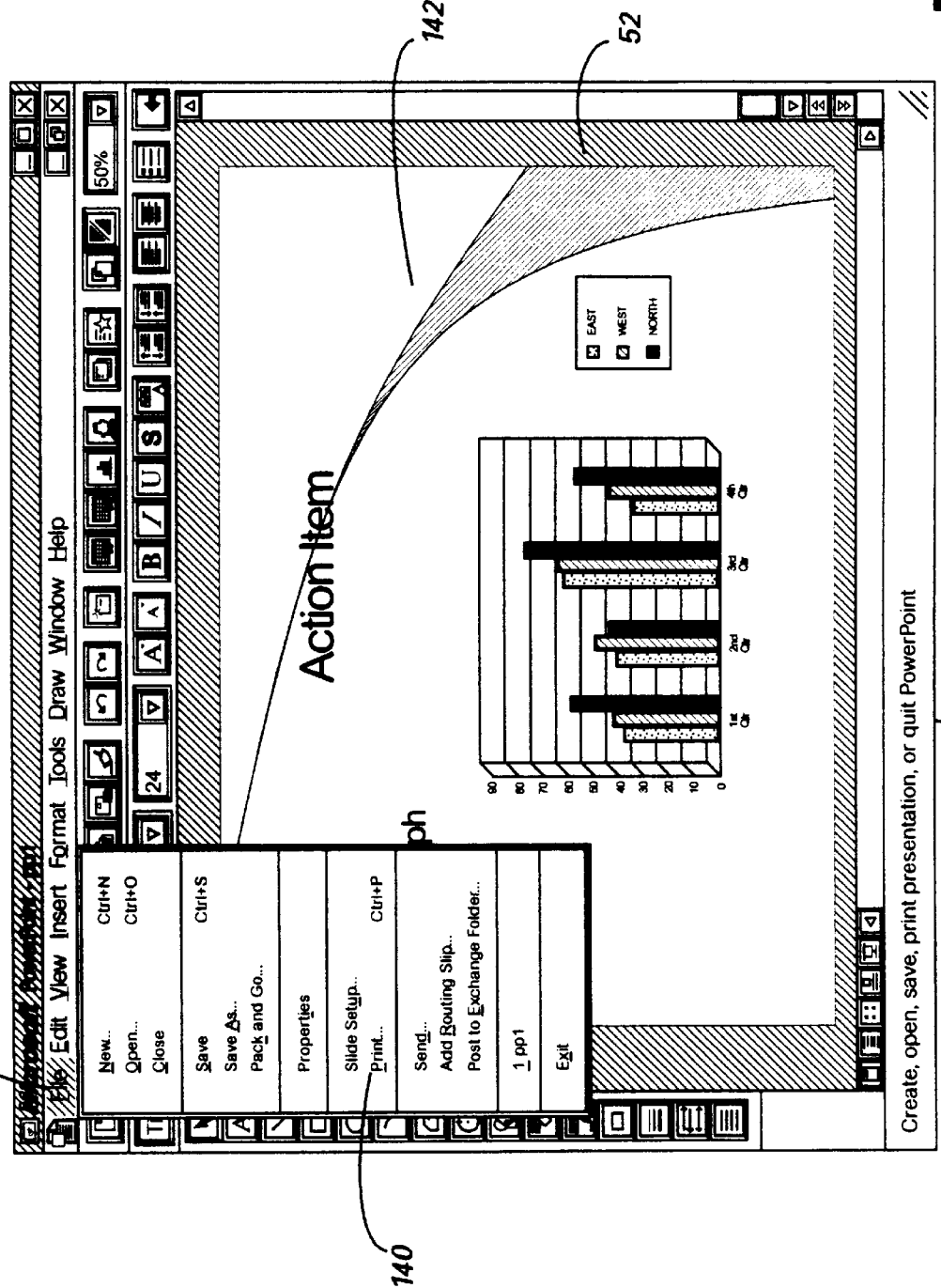
FIG. 6 is a screen display illustrating a selection of a "File" menu in connection with printing a black and white presentation on a printer in accordance with the preferred embodiment of the present invention.
Figure 7:
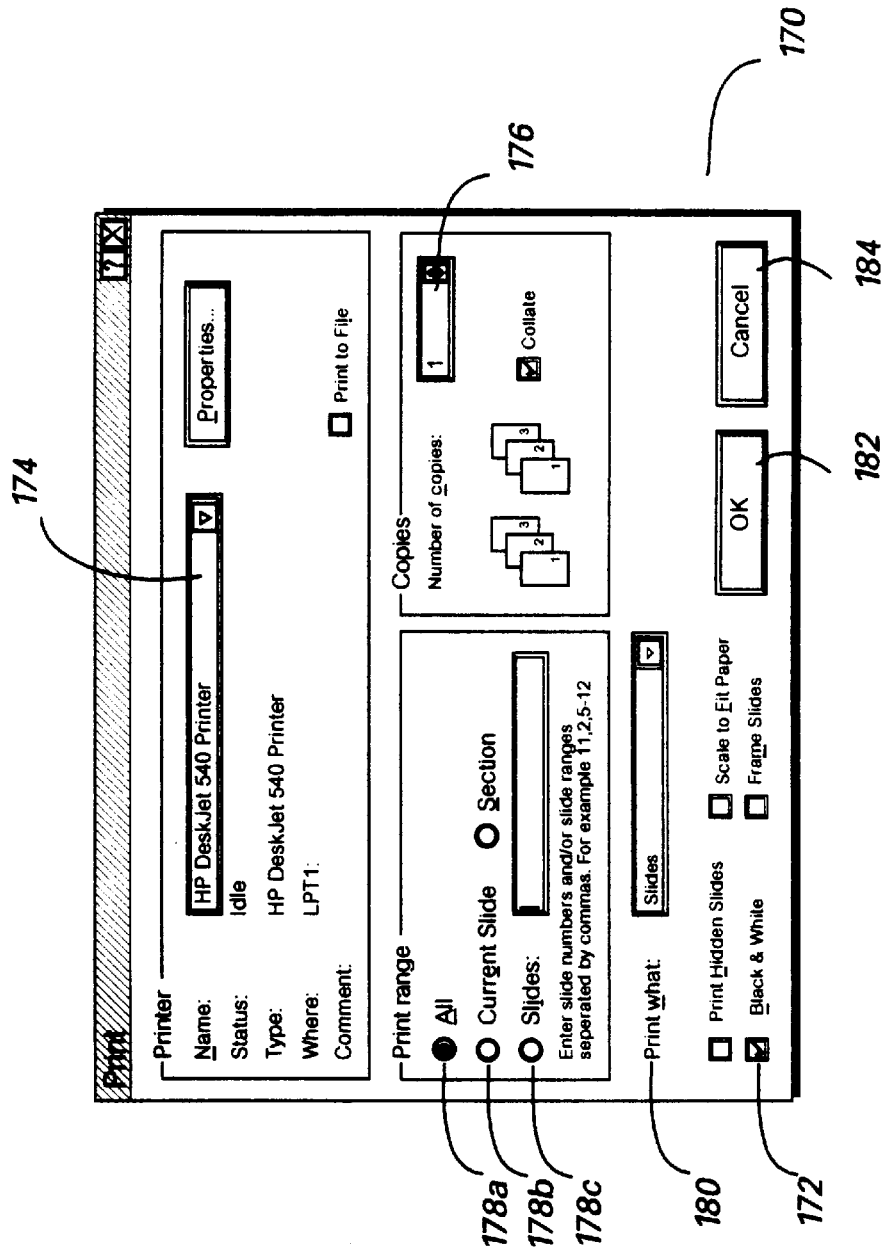
FIG. 7 is a screen display illustrating a print dialog box in accordance with the preferred embodiment of the present invention.

Referring to FIGS. 1, 6 and 7, the printing process for printing a presentation in black and white on a printer will now be described. Turning first to FIG. 6, a screen display depicts a selection of a "File" menu in connection with printing a black and white presentation on a printer in accordance with the preferred embodiment of the present invention. When the user has completed customization of the presentation 142 as depicted on the presentation display area 52 of the presentation display screen 50, the user may want to print a final black and white version of the presentation 142 on the printer 38. Customization may be a process of converting graphical items to various modes before deciding on the final version to print.

To initiate the printing process, the user selects the "File" menu 54a using the mouse 29. The user then moves down the "File" menu 54a until a print option 140 is highlighted. Once the print option 140 is highlighted, the presentation program module 37a can automatically detect the type of printer chosen and the print dialog box 170, as shown in FIG. 7, appears on the display screen 50 (FIG. 6).

Now turning to FIG. 7, a screen display of a print dialog box is illustrated in accordance with the preferred embodiment of the present invention. The print dialog box 170 contains the functions needed for printing a presentation on a printer 38. The print functions include selecting the type of printer 174 for printing, selecting the number of copies 176 to be printed, choosing between printing all slides 178a, the current slide 178b, and the slide number and/or range of slides 178c to be printed, and choosing what to print 180, such as slides, an outline, and so forth.

If the user wants to print a black and white version of the presentation 142 (FIG. 6), the user simply selects a black and white checkbox 172 in the print dialog box 170. When this checkbox 172 is selected, the black and white version of the presentation 142 is automatically sent to the printer 38. Otherwise, if the user does not select the checkbox 172, the color version of the presentation (not shown) is sent to the printer 38. The user completes the print process by selecting an "OK" button 182 in the print dialog box 170 once the user has decided whether to print the color or black and white version. The user may also elect not to print the color or black and white presentation by simply selecting a "Cancel" button 184 in the print dialog box 170, which cancels all print operations.

Figure 8:
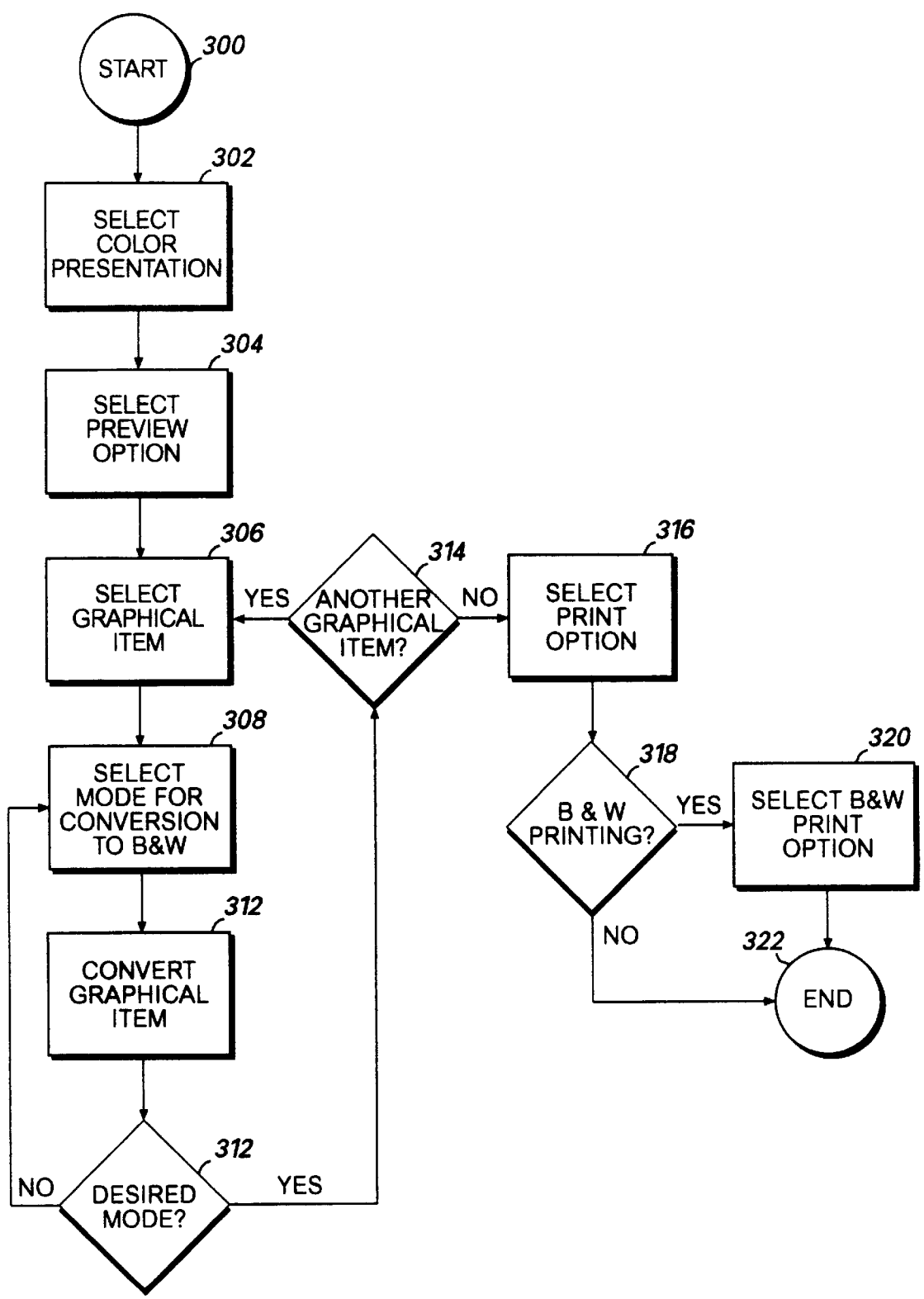
FIG. 8 is a flow diagram illustrating steps that a user follows to create a black and white version of a color presentation in accordance with the preferred embodiment of the present invention.

With continuing reference to FIGS. 1–7, the flow diagram of FIG. 8 illustrates the steps that the user follows to create a black and white version of a color presentation. The user begins at the START step 300 by turning on the computer 10 and selecting the presentation program module 37a for supporting the computer-implemented process for converting color images to black and white.

In step 302, the user either designs a color presentation or the user selects a pre-existing color presentation for conversion to black and white. After the selection is made, the user then selects a preview option in step 304. The preview option allows the user to view a black and white version of the entire color slide. This black and white version of the presentation is a default black and white mode, as previously mentioned, selected by the program module in response to the user selection of the preview option.

To refine this black and white version of the color presentation, the user selects a graphical item on the presentation in step 306. As previously discussed, a graphical item can be text, a frame, a line, a closed shape, or a picture on a slide or page. A graphical item can also be any combination of these graphical items. The user selects the desired graphical item by moving the mouse 29 to the location of the graphical item and clicks the mouse 29. Once the user clicks the mouse 29 on the graphical item, the graphical item is highlighted.

Once the graphical item is selected, the user selects a mode for converting the selected graphical item to black and white in step 308. The selected graphical item is converted to the black and white version of the selected mode in step 310. In step 312, a determination is made whether the user desires the selected mode upon inspection of the converted graphical item. If the mode selected is not desired by the user, then the "NO" branch is followed to step 308; otherwise, the "YES" branch is followed to step 314. In the scenario where the user is not satisfied with the mode selected, steps 308 and 310 are repeated until a desired mode for conversion to black and white is selected.

After selecting the desired mode for conversion, an inquiry is conducted in step 314 to determine whether there is another graphical item that the user desires to alter. If there is another graphical item to be altered to a black and white version, then the "YES" branch is followed to step 306; otherwise, the "NO" branch is followed to step 316. If there are additional graphical items to be converted to black and white, steps 306–312 are repeated until there are no graphical items remaining to be converted. Next, the user performs step 316 by selecting a print option.

In step 318, a determination is made whether the user wants to print the presentation in black and white. If the user wants to print the presentation in black and white, the "YES" branch is followed to step 320; otherwise the "NO" branch is followed to step 322. In step 320, the user selects a black and white print option. Selection of the black and white print option automatically sends the black and white version of the presentation to the printer. Otherwise, if the user does not select the black and white print option, the color version of the presentation will be sent to the printer. The black and white conversion and printing process terminates at the END step 322.

Figure 9:
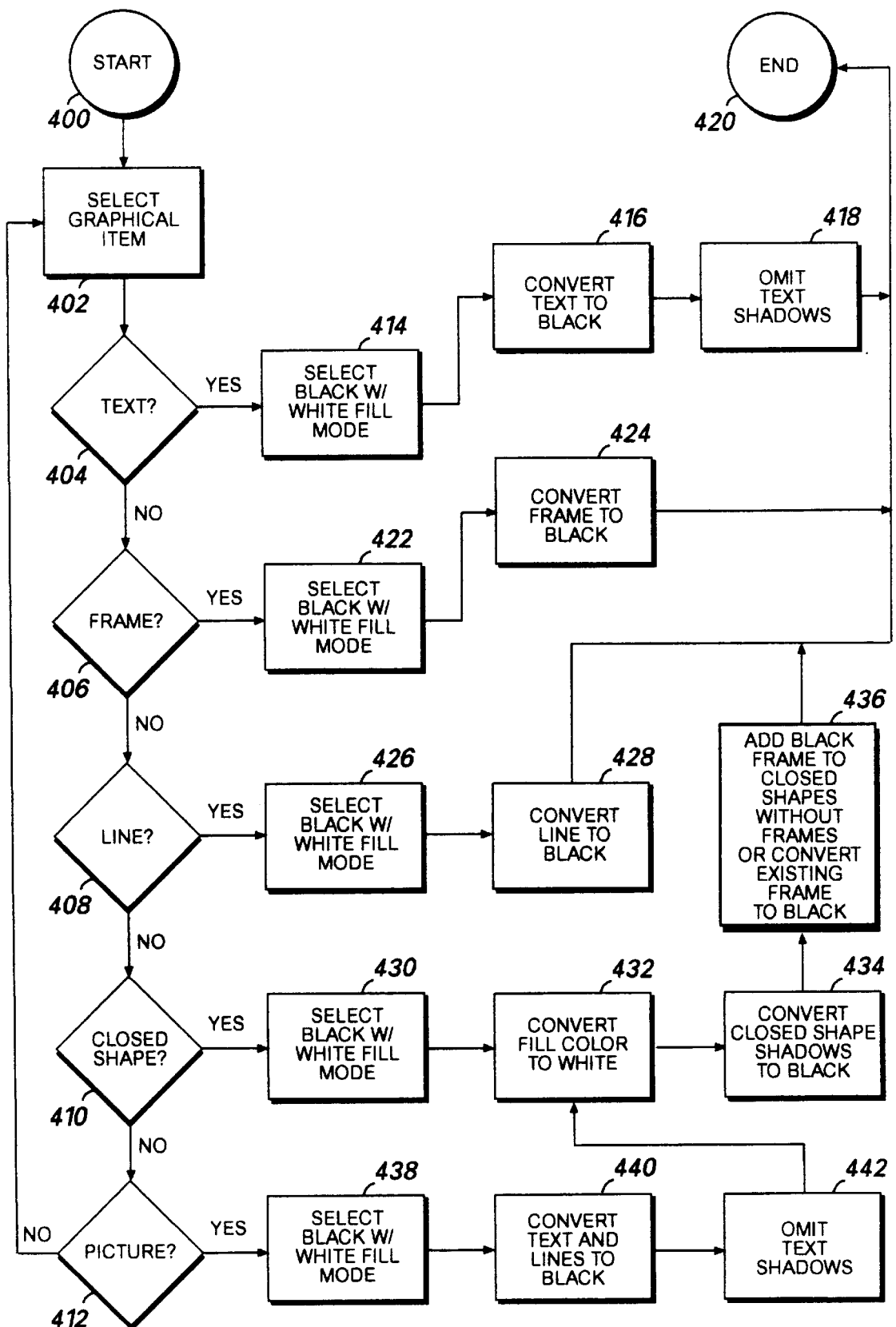
FIG. 9 is a flow diagram illustrating steps for converting a graphical item to black and white in response to selection of a Black With White Fill mode in accordance with the preferred embodiment of the present invention.
Figure 10:
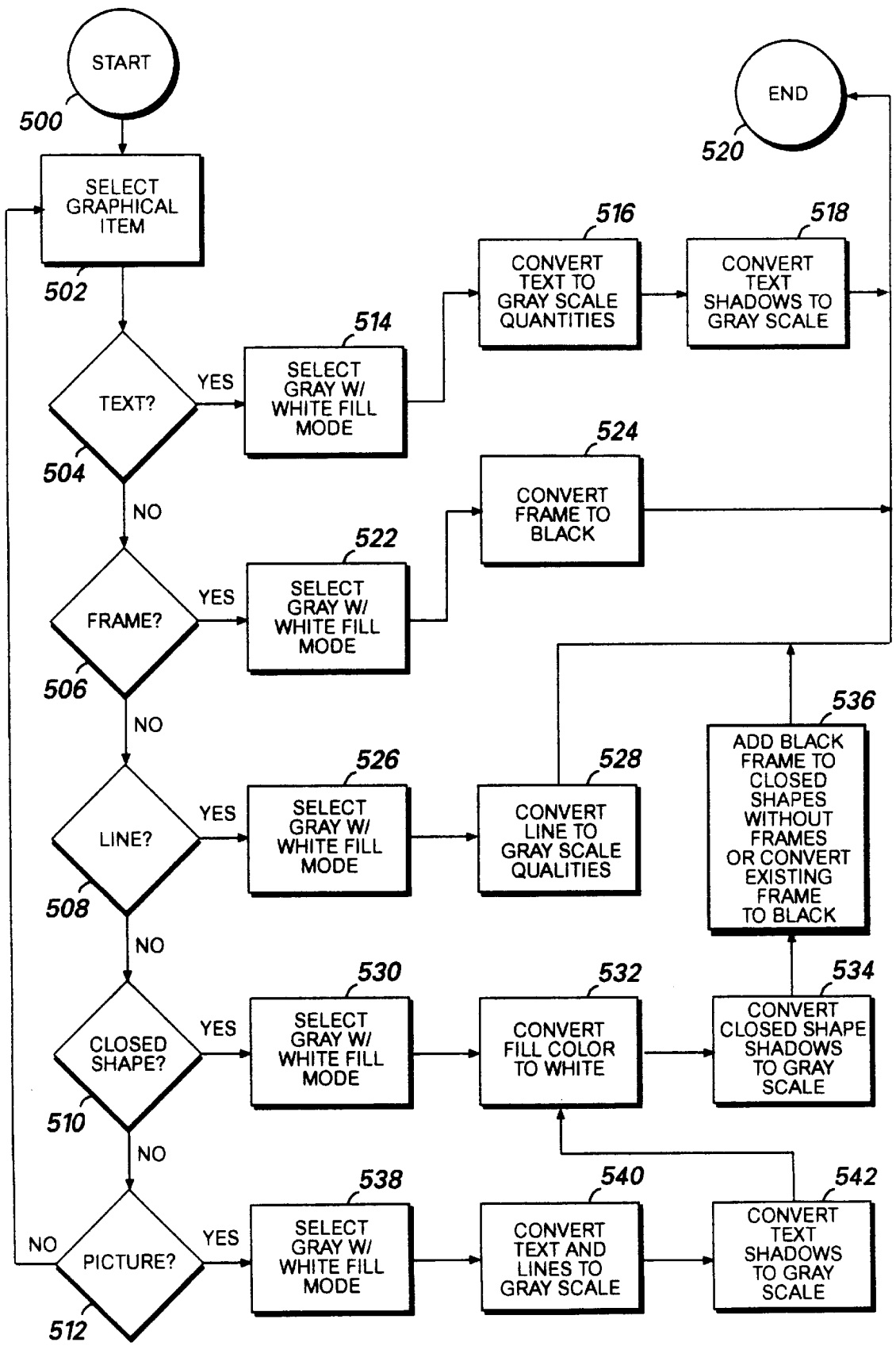
FIG. 10 is a flow diagram illustrating the steps for converting a graphical item to black and white in response to selection of a Gray With White Fill mode in accordance with the preferred embodiment of the present invention.
Figure 11:
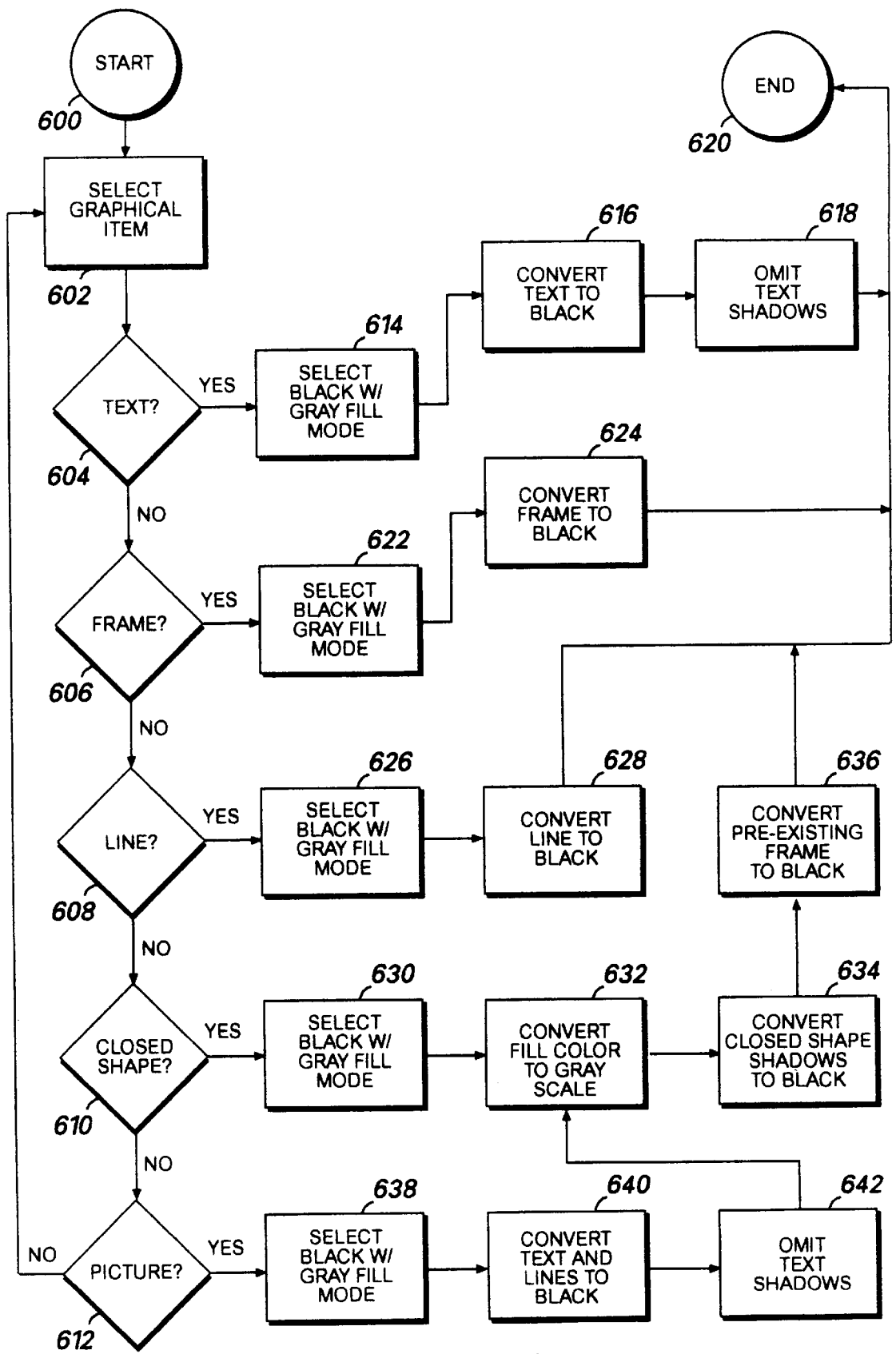
FIG. 11 a flow diagram illustrating the steps for converting a graphical item to black and white in response to selection of a Black With Gray Fill mode in accordance with the preferred embodiment of the present invention.

Referring to FIGS. 9–11, the process by which a computer converts a graphical item to a selected mode, with emphasis on the specific characteristics of the selected mode, will now be described.

FIG. 9 is a flow diagram illustrating the steps for converting a graphical item to black and white in response to selection of the Black With White Fill mode. The Black with White Fill mode, which represents a technique that is known in the art, is primarily designed for converting diagrams and charts that may also contain text.

Now turning to FIG. 9, at the START step 400, the computer parameters are initialized, the presentation program module 37a (FIG. 1) is selected, and the color presentation is selected for conversion to black and white in response to user-provided input.

A graphical item is selected in step 402, in response to user-provided input. After the graphical item is selected, in step 404, a determination is made whether the selected graphical item is text. If the selected graphical item is text, the "YES" branch is followed to step 414; otherwise the "NO" branch is followed to step 406. In step 414, the Black With White Fill mode is selected in response to user-provided input. Next, the selected text is converted to black in step 416. In step 418, text shadows are omitted. The black and white conversion process terminates for this selected graphical item at the END step 420.

If the selected graphical item is not text, in step 406, a determination is made whether the selected graphical item is a frame. If the selected graphical item is a frame, the "YES" branch is followed to step 422; otherwise the "NO" branch is followed to step 408. In step 422, the Black With White Fill mode is selected in response to user-provided input. The frame is converted to black in step 424. The black and white conversion process terminates for this selected graphical item at the END step 420.

If the selected graphical item is not a frame, in step 408, a determination is made whether the selected graphical item is a line. If the selected graphical item is a line, the "YES" branch is followed to step 426; otherwise the "NO" branch is followed to step 410. In step 426, the Black With White Fill mode is selected in response to user-provided input. The line is converted to black in step 428. The black and white conversion process terminates for this selected graphical item at the END step 420.

If the selected graphical item is not a line, in step 410, a determination is made whether the selected graphical item is a closed shape. If the selected graphical item is a closed shape, the "YES" branch is followed to step 430; otherwise the "NO" branch is followed to step 412. In step 430, the Black With White Fill mode is selected in response to user-provided input. Next, the fill color of the closed shape is converted to white in step 432. In step 434, the shadows of the closed shape are converted to black. For a closed shape that has an existing frame, the frame is converted to black in step 436. For a closed shape without a frame, a thin black frame is added to the closed shape. The black and white conversion process terminates for this selected graphical item at the END step 420.

If the graphical item is not a closed shape, in step 412, a determination is made whether the selected graphical item is a picture or a form of clip art. If the selected graphical item is a picture or a form of clip art, the "YES" branch is followed to step 438; otherwise the "NO" branch is followed to step 402. In step 438, the Black With White Fill mode is selected in response to user-provided input. Text and lines are converted to black in step 440. In step 442, text shadows are omitted. Next, the fill color of any closed shape is converted to white in step 432. In step 434, the shadows of the closed shapes are converted to black. For closed shapes that have pre-existing frames, the frames are converted to black in step 436. For closed shapes without frames, thin black frames are added to the closed shapes. The black and white conversion process terminates for this selected graphical item at the END step 420.

FIG. 10 is a flow diagram illustrating the steps for converting a graphical item to black and white in response to selection of the Gray With White Fill mode. This mode is used primarily for diagrams that do not require maximum contrast and the gray scale quantities look better than the black translation in the Black With White Fill mode.

Now turning to FIG. 10, at the START step 500, the computer parameters are initialized, the presentation program module 37a (FIG. 1) is selected, and the color presentation is selected for conversion to black and white in response to user-provided input.

A graphical item is selected in step 502, in response to user-provided input. After the graphical item is selected, in step 504, a determination is made whether the selected graphical item is text. If the selected graphical item is text, the "YES" branch is followed to step 514; otherwise the "NO" branch is followed to step 506. In step 514, the Gray With White Fill mode is selected in response to user-provided input. Next, the selected text is converted to gray scale quantities in step 516. In step 518, text shadows are converted to gray scale quantities. The black and white conversion process terminates for this selected graphical item at the END step 520.

If the selected graphical item is not text, in step 506, a determination is made whether the selected graphical item is a frame. If the selected graphical item is a frame, the "YES" branch is followed to step 522; otherwise the "NO" branch is followed to step 508. In step 522, the Gray With White Fill mode is selected in response to user-provided input. The frame is converted to black in step 524. The black and white conversion process terminates for this selected graphical item at the END step 520.

If the selected graphical item is not a frame, in step 508, a determination is made whether the selected graphical item is a line. If the selected graphical item is a line, the "YES" branch is followed to step 526; otherwise the "NO" branch is followed to step 510. In step 526, the Gray With White Fill mode is selected in response to user-provided input. The line is converted to gray scale quantities in step 528. The black and white conversion process terminates for this selected graphical item at the END step 520.

If the selected graphical item is not a line, in step 510, a determination is made whether the selected graphical item is a closed shape. If the selected graphical item is a closed shape, the "YES" branch is followed to step 530; otherwise the "NO" branch is followed to step 512. In step 530, the Gray With White Fill mode is selected in response to user-provided input. Next, the fill color of the closed shape is converted to white in step 532. In step 534, the shadows of the closed shape are converted to gray scale quantities. For a closed shape that has a pre-existing frame, the frame is converted to black in step 536. For a closed shape without a frame, a thin black frame is added to the closed shape. The black and white conversion process terminates for this selected graphical item at the END step 520.

If the graphical item is not a closed shape, in step 512, a determination is made whether the selected graphical item is a picture or a form of clip art. If the selected graphical item is a picture or a form of clip art, the "YES" branch is followed to step 538; otherwise the "NO" branch is followed to step 502. In step 538, the Gray With White Fill mode is selected in response to user-provided input. Text and lines are converted to gray scale quantities in step 540. In step 542, text shadows are converted to gray scale quantities. Next, the fill color of any closed shape is converted to white in step 532. In step 534, the shadows of the closed shapes are converted to gray scale quantities. For closed shapes that have pre-existing frames, the frames are converted to black in step 536. For closed shapes without frames, thin black frames are added to the closed shapes. The black and white conversion process terminates for this selected graphical item at the END step 520.

FIG. 11 is a flow diagram illustrating the steps for converting a graphical item to black and white in response to selection of the Black With Gray Fill mode. This mode, which is known in the art, is used for diagrams where the user wants special fills to remain in the black and white version.

Now turning to FIG. 11, at the START step 600, the computer parameters are initialized, the presentation program module 37a (FIG. 1) is selected, and the color presentation is selected for conversion to black and white in response to user-provided input.

A graphical item is selected in step 602, in response to user-provided input. After the graphical item is selected, in step 604, a determination is made whether the selected graphical item is text. If the selected graphical item is text, the "YES" branch is followed to step 614; otherwise the "NO" branch is followed to step 606. In step 614, the Black With Gray Fill mode is selected in response to user-provided input. Next, the selected text is converted to black in step 616. In step 618, text shadows are omitted. The black and white conversion process terminates for this selected graphical item at the END step 620.

If the selected graphical item is not text, in step 606, a determination is made whether the selected graphical item is a frame. If the selected graphical item is a frame, the "YES" branch is followed to step 622; otherwise the "NO" branch is followed to step 608. In step 622, the Black With Gray Fill mode is selected in response to user-provided input. The frame is converted to black in step 624. The black and white conversion process terminates for this selected graphical item at the END step 620.

If the selected graphical item is not a frame, in step 608, a determination is made whether the selected graphical item is a line. If the selected graphical item is a line, the "YES" branch is followed to step 626; otherwise the "NO" branch is followed to step 610. In step 626, the Black With Gray Fill mode is selected in response to user-provided input. The line is converted to black in step 628. The black and white conversion process terminates for this selected graphical item at the END step 620.

If the selected graphical item is not a line, in step 610, a determination is made whether the selected graphical item is a closed shape. If the selected graphical item is a closed shape, the "YES" branch is followed to step 630; otherwise the "NO" branch is followed to step 612. In step 630, the Black With Gray Fill mode is selected in response to user-provided input. Next, the fill color of the closed shape is converted to gray scale quantities in step 632. In step 634, the shadows of the closed shape are converted to black. For a closed shape that has a pre-existing frame, the frame is converted to black in step 636; otherwise, no frame is added for a closed shape that does not have a pre-existing frame. The black and white conversion process terminates for this selected graphical item at the END step 620.

If the graphical item is not a closed shape, in step 612, a determination is made whether the selected graphical item is a picture or a form of clip art. If the selected graphical item is a picture or a form of clip art, the "YES" branch is followed to step 638; otherwise the "NO" branch is followed to step 602. In step 638, the Black With Gray Fill mode is selected in response to user-provided input. Text and lines are converted to black in step 640. In step 642, text shadows are omitted. Next, the fill color of any closed shape is converted to gray scale quantities in step 632. In step 634, the shadows of the closed shapes are converted to black. For closed shapes that have existing frames, the frames are converted to black in step 636; otherwise no frame is added for closed shapes without pre-existing frames. The black and white conversion process terminates for this selected graphical item at the END step 620.

For the Gray Scale mode, which is well known in the art, each selected graphical item is converted to gray scale quantities, which are varying shades of gray. This mode is appropriate for realistic drawings, such as drawings of real objects, people, and scenes. This mode is also useful for stylistic symbols like logotypes.

For the Light Gray Scale mode, each selected graphical item is converted to one half of gray scale quantities. For example, black converts to fifty percent gray and fifty percent gray converts to twenty-five percent gray. This mode is appropriate for the same situations as the Gray Scale mode when an image in a background should not stand out.

For the Inverse Gray Scale mode, each selected graphical item is converted to the inverse of gray scale quantities. For example, black converts to white, white converts to black, twenty percent gray converts to eighty percent gray, and so forth. This mode is useful for diagrams where information from colors must be maintained, but the original colors were chosen to be light in order to contrast with a dark background.

For the Black mode, each selected graphical item is converted to black. For the White mode, each selected graphical item is converted to white. These modes are used only in special situations.

For the Don't Show mode, each selected graphical item is omitted. This mode is usually used for non-essential background decoration that makes the background look cluttered when translated to black and white.

In summary, the present invention provides an improved method for black and white printing of colored pages, which are primarily designed for viewing on a computer display screen or as color presentations. Colored images, objects and text on a presentation can be altered, item-by-item, to view the black and white version of each item before printing the presentation. In addition, a variety of modes for black and white conversion is provided to obtain the best black and white version of the item selected. As a result, the black and white presentation can be printed on a printer as viewed on the computer display screen.

Alternative embodiments will become apparent to those skilled in the art to which the present invention pertains without departing from its spirit and scope. Accordingly, the scope of the present invention is defined by the appended claims rather than the foregoing description.

We claim:

1. A method for converting a colored page containing at least one graphical item to a customized black and white page for black and white printing, such that user-preference determines the appearance of each graphical item on the colored page, comprising the steps of:
    (a) selecting said colored page for conversion to black and white;
    (b) converting said colored page to black and white default settings;
    (c) selecting one of said graphical items for customization based on user-provided input;
    (d) selecting one of a plurality of black and white modes for converting said selected graphical item to a preset black and white setting other than the black and white default settings, said black and white modes varying in black and white conversion of said selected graphical item;
    (e) in response to selecting said one of said plurality of black and white modes, converting said selected graphical item to said preset black and white setting based on said selected black and white mode; and
    (f) repeating steps (c) through (e) for additional graphical items on said colored page,
    the colored page being converted to the customized black and white page in accordance with the black and white mode selected based on user-preference for each selected graphical item.

2. The method recited in claim 1 further comprising the step of:
    (g) printing the customized black and white page.

3. The method recited in claim 1, wherein said step of selecting one of said graphical items comprises selecting one of the following:
    (1) text, said text comprising alphanumeric characters;
    (2) a frame;
    (3) a line, said lines comprising line segments and splines;
    (4) a closed shape; and
    (5) a picture.

4. The method recited in claim 1, wherein said step of selecting one of a plurality of black and white modes for converting said selected graphical item to said preset black and white setting other than the default setting comprises selecting one of the following modes:
    (1) a gray scale mode;
    (2) a light gray scale mode;
    (3) an inverse gray scale mode;
    (4) a black with white fill mode;
    (5) a gray with white fill mode;
    (6) a black with gray fill mode;
    (7) a black mode;
    (8) a white mode;
    (9) a don't show mode; and
    (10) an automatic mode.

5. The method recited in claim 1, wherein said step of selecting one of a plurality of black and white modes for converting said selected graphical item to said preset black and white setting other than the default setting comprises selecting a gray scale mode, wherein said gray scale mode comprises converting said graphical item to gray scale quantities, said gray scale quantities varying in shades of gray.

6. The method recited in claim 1, wherein said step of selecting one of a plurality of black and white modes for converting said selected graphical item to said preset black and white setting other than the default setting comprises selecting a light gray scale mode, wherein said light gray scale mode comprises converting said graphical item to half of gray scale quantities, said gray scale quantities varying in shades of gray.

7. The method recited in claim 1, wherein said step of selecting one of a plurality of black and white modes for converting said selected graphical item to said preset black and white setting other than the default setting comprises selecting an inverse gray scale mode, wherein said inverse gray scale mode comprises converting said graphical item to the inverse of gray scale quantities, said gray scale quantities varying in shades of gray.

8. The method recited in claim 1, wherein said step of selecting one of a plurality of black and white modes for converting said selected graphical item to said preset black and white setting other than the default setting comprises selecting a black with white fill mode, wherein said black with white fill mode comprises:
    converting a fill color of a closed shape to white;
    converting lines and frames to black, said lines comprising line segments and splines;
    converting text to black, said text comprising alphanumeric characters;
    omitting text shadows;
    converting closed shape shadows to black; and
    adding a black frame to said closed shape without frames.

9. The method recited in claim 1, wherein said step of selecting one of a plurality of black and white modes for converting said selected graphical item to said preset black and white setting other than the default setting comprises selecting a gray with white fill mode, wherein said gray with white fill mode comprises:
    converting a fill color of a closed shape to white;

converting lines to gray scale quantities, said gray scale quantities varying in shades of gray, said lines comprising line segments and splines;

converting frames to black;

converting text to said gray scale quantities, said text comprising alphanumeric characters;

converting text shadows to said gray scale quantities;

converting closed shape shadows to said gray scale quantities; and adding a black frame to closed shapes without said frames.

10. The method recited in claim 1, wherein said step of selecting one of a plurality of black and white modes for converting said selected graphical item to said preset black and white setting other than the default setting comprises selecting a black with gray fill mode, wherein said black with gray fill mode comprises:

converting a fill color of a closed shape to gray scale quantities, said gray scale quantities varying in shades of gray;

converting lines and frames to black, said lines comprising line segments and splines;

converting text to black, said text comprising alphanumeric characters;

omitting text shadows; and converting closed shape shadows to black.

11. The method recited in claim 1, wherein said step of selecting one of a plurality of black and white modes for converting said selected graphical item to said preset black and white setting other than the default setting comprises selecting a black mode, wherein said black mode comprises converting all colors of a figure to black, said figure comprising at least one of the graphical items on said page.

12. The method recited in claim 1, wherein said step of selecting one of a plurality of black and white modes for converting said selected graphical item to said preset black and white setting other than the default setting comprises selecting a white mode, wherein said white mode comprises converting all colors of a figure to white, said figure comprising at least one of the graphical items on said page.

13. The method recited in claim 1, wherein said step of selecting one of a plurality of black and white modes for converting said selected graphical item to said preset black and white setting other than the default setting comprises selecting a don't show mode, wherein said don't show mode comprises omitting a figure in its entirety, said figure comprising at least one of the graphical items on said page.

14. The method recited in claim 1, wherein said step of selecting one of a plurality of black and white modes for converting said selected graphical item to said preset black and white setting other than the default setting comprises selecting an automatic mode, wherein said automatic mode comprises combining more than one of said plurality of modes to create a standard mode conversion for said selected graphical item.

15. A computer-readable medium on which is stored a program module for converting a colored page containing at least one graphical item to a customized black and white page for black and white printing, such that user-preference determines the appearance of each graphical item on the colored page, said program module comprising instructions which, when executed by a computer, perform the steps of:

(a) selecting said colored page for conversion to black and white;

(b) converting said colored page to black and white default settings;

(c) selecting one of said graphical items for customization in response to user-provided input;

(d) selecting one of a plurality of black and white modes for converting said selected graphical item to a preset black and white setting other than the black and white default settings, said black and white modes varying in black and white conversion of said selected graphical item;

(e) in response to selecting said one of said plurality of black and white modes, converting said selected graphical item to said preset black and white setting based on said selected black and white mode;

(f) displaying the customized black and white page in response to performing step (e); and (g) repeating steps (c) through (f) for additional graphical items on said colored page, where the additional graphical items are selected based on user-preference.

16. The computer-readable medium recited in claim 15, wherein said step of selecting one of said plurality of black and white modes comprises selecting a gray scale mode, wherein said gray scale mode comprises converting said graphical item to gray scale quantities, said gray scale quantities varying in shades of gray.

17. The computer-readable medium recited in claim 15, wherein said step of selecting one of said plurality of black and white modes comprises selecting a light gray scale mode, wherein said light gray scale mode comprises converting said graphical item to half of gray scale quantities, said gray scale quantities varying in shades of gray.

18. The computer-readable medium recited in claim 15, wherein said step of selecting one of said plurality of black and white modes comprises selecting an inverse gray scale mode, wherein said inverse gray scale mode comprises converting said graphical item to the inverse of gray scale quantities, said gray scale quantities varying in shades of gray.

19. The computer-readable medium recited in claim 15, wherein said step of selecting one of said plurality of black and white modes comprises selecting a black with white fill mode, wherein said black with white fill mode comprises:

converting a fill color of a closed shape to white;

converting lines and frames to black, said lines comprising line segments and splines;

converting text to black, said text comprising alphanumeric characters;

omitting text shadows;

converting closed shape shadows to black; and adding a black frame to closed shapes without said frames.

20. The computer-readable medium recited in claim 15, wherein said step of selecting one of said plurality of black and white modes comprises selecting a gray with white fill mode, wherein said gray with white fill mode comprises:

converting a fill color of a closed shape to white;

converting lines to gray scale quantities, said gray scale quantities varying in shades of gray, said lines comprising line segments and splines;

converting frames to black;

converting text to said gray scale quantities, said text comprising alphanumeric characters;

converting text shadows to said gray scale quantities;

converting closed shape shadows to said gray scale quantities; and adding a black frame to closed shapes without said frames.

21. The computer-readable medium recited in claim 15, wherein said step of selecting one of said plurality of black and white modes comprises selecting a black with gray fill mode, wherein said black with gray fill mode comprises:

converting a fill color of a closed shape to gray scale quantities, said gray scale quantities varying in shades of gray;

converting lines and frames to black, said lines comprising line segments and splines;

converting text to black, said text comprising alphanumeric characters;

omitting text shadows; and converting closed shape shadows to black.

22. The computer-readable medium recited in claim 15, wherein said step of selecting one of said plurality of black and white modes comprises selecting a black mode, wherein said black mode comprises converting all colors of a figure to black, said figure comprising at least one of the graphical items on said page.

23. The computer-readable medium recited in claim 15, wherein said step of selecting one of said plurality of black and white modes comprises selecting a white mode, wherein said white mode comprises converting all colors of a figure to white, said figure comprising at least one of the graphical items on said page.

24. The computer-readable medium recited in claim 15, wherein said step of selecting one of said plurality of black and white modes comprises selecting a don't show mode, wherein said don't show mode comprises omitting a figure in its entirety, said figure comprising at least one of the graphical items on said page.

25. The computer-readable medium recited in claim 15, wherein said step of selecting one of said plurality of black and white modes comprises selecting an automatic mode, wherein said automatic mode comprises combining more than one of said plurality of modes to create a standard mode conversion for said selected graphical item.

26. The method recited in claim 15, wherein said step of selecting one of a plurality of black and white modes for converting said selected graphical item to said preset black and white setting other than the default setting comprises selecting one of the following modes:

(1) a gray scale mode;

(2) a light gray scale mode;

(3) an inverse gray scale mode;

(4) a black with white fill mode;

(5) a gray with white fill mode;

(6) a black with gray fill mode;

(7) a black mode;

(8) a white mode;

(9) a don't show mode; and

(10) an automatic mode.

27. A method for converting graphical items associated with a colored page to a plurality of black and white modes based on user-preference to produce a customized black and white page for black and white printing, comprising the steps of:

(a) selecting one of the graphical items associated with the colored page based on user-provided input for conversion to black and white;

(b) selecting one of the plurality of black and white modes based on user-provided input for converting the selected one of the graphical items to black and white, the plurality of black and white modes each varying in black and white conversion of the selected one of the graphical items;

(c) in response to selecting the one of the plurality of black and white modes, converting the selected one of the graphical items to the black and white conversion associated with the selected one of the plurality of black and white modes; and (d) repeating steps (a) through (c) for additional graphical items on the colored page, the colored page being converted to the customized black and white page in accordance with the plurality of black and white modes selected based on user-preference for each selected one of the graphical items.

28. The method recited in claim 27 further comprising the step of:

(f) printing the customized black and white page.

29. The method recited in claim 27, wherein the step of selecting one of a plurality of black and white modes based on user-provided input for converting the selected one of the graphical items to black and white comprises selecting one of the following modes:

(1) a gray scale mode;

(2) a light gray scale mode;

(3) an inverse gray scale mode;

(4) a black with white fill mode;

(5) a gray with white fill mode;

(6) a black with gray fill mode;

(7) a black mode;

(8) a white mode;

(9) a don't show mode; and

(10) an automatic mode.

30. The method recited in claim 27, wherein the step of selecting one of the plurality of black and white modes based on user-provided input for converting the selected one of the graphical items to black and white comprises selecting a gray scale mode, wherein the gray scale mode comprises converting the selected one of the graphical items to gray scale quantities, the gray scale quantities varying in shades of gray.

31. The method recited in claim 27, wherein the step of selecting the one of the plurality of black and white modes based on user-provided input for converting the selected one of the graphical items to black and white comprises selecting a light gray scale mode, wherein the light gray scale mode comprises converting the selected one of the graphical items to half of gray scale quantities, the gray scale quantities varying in shades of gray.

32. The method recited in claim 27, wherein the step of selecting the one of the plurality of black and white modes based on user-provided input for converting the selected one of the graphical items to black and white comprises selecting an inverse gray scale mode, wherein the inverse gray scale mode comprises converting the selected one of the graphical items to the inverse of gray scale quantities, the gray scale quantities varying in shades of gray.

33. The method recited in claim 27, wherein the step of selecting the one of the plurality of black and white modes based on user-provided input for converting the selected one of the graphical items to black and white comprises selecting a black with white fill mode, wherein the black with white fill mode comprises:

converting a fill color of a closed shape to white;

converting lines and frames to black, the lines comprising line segments and splines;

converting text to black, the text comprising alphanumeric characters;

omitting text shadows;

converting closed shape shadows to black; and adding a black frame to the closed shape without frames.

34. The method recited in claim 27, wherein the step of selecting the one of the plurality of black and white modes based on user-provided input for converting the selected one of the graphical items to black and white comprises selecting a gray with white fill mode, wherein the gray with white fill mode comprises:

converting a fill color of a closed shape to white;

converting lines to gray scale quantities, the gray scale quantities varying in shades of gray, the lines comprising line segments and splines;

converting frames to black;

converting text to the gray scale quantities, the text comprising alphanumeric characters;

converting text shadows to the gray scale quantities;

converting closed shape shadows to the gray scale quantities; and adding a black frame to closed shapes without the frames.

35. The method recited in claim 27, wherein the step of selecting the one of the plurality of black and white modes based on user-provided input for converting the selected one of the graphical items to black and white comprises selecting a black with gray fill mode, wherein the black with gray fill mode comprises:

converting a fill color of a closed shape to gray scale quantities, the gray scale quantities varying in shades of gray;

converting lines and frames to black, the lines comprising line segments and splines;

converting text to black, the text comprising alphanumeric characters;

omitting text shadows; and converting closed shape shadows to black.

36. The method recited in claim 27, wherein the step of selecting the one of the plurality of black and white modes based on user-provided input for converting the selected one of the graphical items to black and white comprises selecting a black mode, wherein the black mode comprises converting all colors of a figure to black, the figure comprising at least one of the graphical items on the colored page.

37. The method recited in claim 27, wherein the step of selecting the one of the plurality of black and white modes based on user-provided input for converting the selected one of the graphical items to black and white comprises selecting a white mode, wherein the white mode comprises converting all colors of a figure to white, the figure comprising at least one of the graphical items on the colored page.

38. The method recited in claim 27, wherein the step of selecting the one of the plurality of black and white modes based on user-provided input for converting the selected one of the graphical items to black and white comprises selecting a don't show mode, wherein the don't show mode comprises omitting a figure in its entirety, the figure comprising at least one of the graphical items on the colored page.

39. The method recited in claim 27, wherein the step of selecting the one of the plurality of black and white modes based on user-provided input for converting the selected one of the graphical items to black and white comprises selecting an automatic mode, wherein the automatic mode comprises combining more than one of the plurality of black and white modes to create a standard mode conversion for the selected one of the graphical items.

40. A method for converting graphical items associated with a colored page to a black with white fill mode based on user-preference to produce a customized black and white page for black and white printing, comprising the steps of:

(a) selecting one of the graphical items associated with the colored page based on user-provided input for conversion to black and white;

(b) selecting the black with white fill mode based on user-provided input for converting the selected one of the graphical items to black and white, wherein the black with white fill mode comprises:

converting a fill color of a closed shape to white, converting lines and frames to black, said lines comprising line segments and splines, converting text to black, said text comprising alphanumeric characters, omitting text shadows, converting closed shape shadows to black, and adding a black frame to said closed shape without frames;

(c) converting the selected one of the graphical items to the black with white fill mode; and (d) repeating steps (a) through (c) for additional graphical items on the colored page, the colored page being converted to the customized black and white page in accordance with the black with white fill mode selected based on user-preference for each selected one of the graphical items.

41. A method for converting graphical items associated with a colored page to a gray with white fill mode based on user-preference to produce a customized black and white page for black and white printing, comprising the steps of:

(a) selecting one of the graphical items associated with the colored page based on user-provided input for conversion to black and white;

(b) selecting the gray with white fill mode based on user-provided input for converting the selected one of the graphical items to black and white, wherein the gray with white fill mode comprises:

converting a fill color of a closed shape to white, converting lines to gray scale quantities, said gray scale quantities varying in shades of gray, said lines comprising line segments and splines, converting frames to black, converting text to said gray scale quantities, said text comprising alphanumeric characters, converting text shadows to said gray scale quantities, converting closed shape shadows to said gray scale quantities, and adding a black frame to closed shapes without said frames;

(c) converting the selected one of the graphical items to the gray with white fill mode; and (d) repeating steps (a) through (c) for additional graphical items on the colored page, the colored page being converted to the customized black and white page in accordance with the gray with white fill mode selected based on user-preference for each selected one of the graphical items.

42. A method for converting graphical items associated with a colored page to a black with gray fill mode based on user-preference to produce a customized black and white page for black and white printing, comprising the steps of:

(a) selecting one of the graphical items associated with the colored page based on user-provided input for conversion to black and white;

(b) selecting the black with gray fill mode based on user-provided input for converting the selected one of the graphical items to black and white, wherein the black with gray fill mode comprises:
converting a fill color of a closed shape to gray scale quantities, said gray scale quantities varying in shades of gray,
converting lines and frames to black, said lines comprising line segments and splines,
converting text to black, said text comprising alphanumeric characters,
omitting text shadows, and
converting closed shape shadows to black;

(c) converting the selected one of the graphical items to the black with gray fill mode; and (d) repeating steps (a) through (c) for additional graphical items on the colored page, the colored page being converted to the customized black and white page in accordance with the black with gray fill mode selected based on user-preference for each selected one of the graphical items.

43. A method for converting graphical items associated with a colored page to an automatic mode based on user-preference to produce a customized black and white page for black and white printing, comprising the steps of:

(a) selecting one of the graphical items associated with the colored page based on user-provided input for conversion to black and white;

(b) selecting the automatic mode based on user-provided input for converting the selected one of the graphical items to black and white, the automatic mode comprising combining a plurality of black and white modes to create a standard mode conversion for said selected graphical item, the plurality of black and white modes each varying in black and white conversion of the selected one of the graphical items;

(c) converting the selected one of the graphical items to the automatic mode; and (d) repeating steps (a) through (c) for additional graphical items on the colored page, the colored page being converted to the customized black and white page in accordance with the automatic mode selected based on user-preference for each selected one of the graphical items.

44. The method recited in claim 43 further comprising the step of:

(f) printing the customized black and white page.

45. The method recited in claim 43, wherein the plurality of black and white modes to create the standard mode conversion for said selected graphical item comprises the following modes:

(1) a gray scale mode;
(2) a light gray scale mode;
(3) an inverse gray scale mode;
(4) a black with white fill mode;
(5) a gray with white fill mode;
(6) a black with gray fill mode;
(7) a black mode;
(8) a white mode; and
(9) a don't show mode.

46. The method recited in claim 45, wherein the gray scale mode comprises converting the selected one of the graphical items to gray scale quantities, the gray scale quantities varying in shades of gray.

47. The method recited in claim 45, wherein the light gray scale mode comprises converting the selected one of the graphical items to half of gray scale quantities, the gray scale quantities varying in shades of gray.

48. The method recited in claim 45, wherein the inverse gray scale mode comprises converting the selected one of the graphical items to the inverse of gray scale quantities, the gray scale quantities varying in shades of gray.

49. The method recited in claim 45, wherein the black with white fill mode comprises:
converting a fill color of a closed shape to white;
converting lines and frames to black, the lines comprising line segments and splines;
converting text to black, the text comprising alphanumeric characters;
omitting text shadows;
converting closed shape shadows to black; and
adding a black frame to the closed shape without frames.

50. The method recited in claim 45, wherein the gray with white fill mode comprises:
converting a fill color of a closed shape to white;
converting lines to gray scale quantities, the gray scale quantities varying in shades of gray, the lines comprising line segments and splines;
converting frames to black;
converting text to the gray scale quantities, the text comprising alphanumeric characters;
converting text shadows to the gray scale quantities;
converting closed shape shadows to the gray scale quantities; and
adding a black frame to closed shapes without the frames.

51. The method recited in claim 45, wherein the black with gray fill mode comprises:
converting a fill color of a closed shape to gray scale quantities, the gray scale quantities varying in shades of gray;
converting lines and frames to black, the lines comprising line segments and splines;
converting text to black, the text comprising alphanumeric characters;
omitting text shadows; and
converting closed shape shadows to black.

52. The method recited in claim 45, wherein the black mode comprises converting all colors of a figure to black, the figure comprising at least one of the graphical items on the colored page.

53. The method recited in claim 45, wherein the white mode comprises converting all colors of a figure to white, the figure comprising at least one of the graphical items on the colored page.

54. The method recited in claim 45, wherein the don't show mode comprises omitting a figure in its entirety, the figure comprising at least one of the graphical items on the colored page.

* * * * *